United States Patent [19]  
Häusler et al.

[11] 4,420,073  
[45] Dec. 13, 1983

[54] APPARATUS FOR TRANSFERRING ROD-SHAPED ARTICLES FROM A SOURCE OF SUPPLY INTO THE FLUTES OF A CONVEYOR

[75] Inventors: Nikolaus Häusler, Oststeinbek; Klaus-Dieter Mallon, Hamburg, both of Fed. Rep. of Germany

[73] Assignee: Hauni-Werke Körber & Co. KG., Hamburg, Fed. Rep. of Germany

[21] Appl. No.: 238,675

[22] Filed: Feb. 27, 1981

[30] Foreign Application Priority Data

Mar. 1, 1980 [DE] Fed. Rep. of Germany ....... 3007880  
Dec. 8, 1980 [DE] Fed. Rep. of Germany ....... 3046223

[51] Int. Cl.³ ............................................... B65G 1/00  
[52] U.S. Cl. ................................... 198/347; 198/572; 198/579  
[58] Field of Search ............... 198/347, 460, 453–455, 198/462, 481, 533, 572, 573, 575, 577, 579; 131/282, 283, 909

[56] References Cited  
U.S. PATENT DOCUMENTS 1,416,763 5/1922 Thom ................................. 198/455  
3,305,128 2/1967 Dearsley ............................ 198/347  
3,513,962 5/1970 Stone et al. ......................... 198/455  
3,921,790 11/1975 Hinchcliffe et al. ............... 198/347  
4,269,299 5/1981 Goodman .......................... 198/347  
4,296,660 10/1981 Cristiani ............................ 198/462

FOREIGN PATENT DOCUMENTS 2005665 8/1971 Fed. Rep. of Germany ...... 131/282  
2758863 7/1979 Fed. Rep. of Germany ...... 198/347

Primary Examiner—Joseph E. Valenza  
Attorney, Agent, or Firm—Kontler, Grimes & Battersby

[57] ABSTRACT

A magazine which contains a supply of parallel filter rod sections has an outlet which discharges a multi-layer stream of sections onto a receiving conveyor which delivers the sections into a gap between two parallel belt conveyors wherein the sections form a single layer and are positively advanced into successive flutes of a rotary drum-shaped withdrawing conveyor. The speed of the receiving conveyor equals or exceeds the speed of the flutes, and the speed of the belt conveyors exceeds the speed of the receiving conveyor. This ensures that the gap invariably contains a layer of parallel sections so that the belt conveyors can admit a section into each oncoming flute of the withdrawing conveyor. The sections which issue from the outlet and are about to enter the gap accumulate in a pileup zone which is disposed above the receiving conveyor and from which the receiving conveyor accepts sections in the absence of adequate delivery via outlet of the magazine.

22 Claims, 8 Drawing Figures

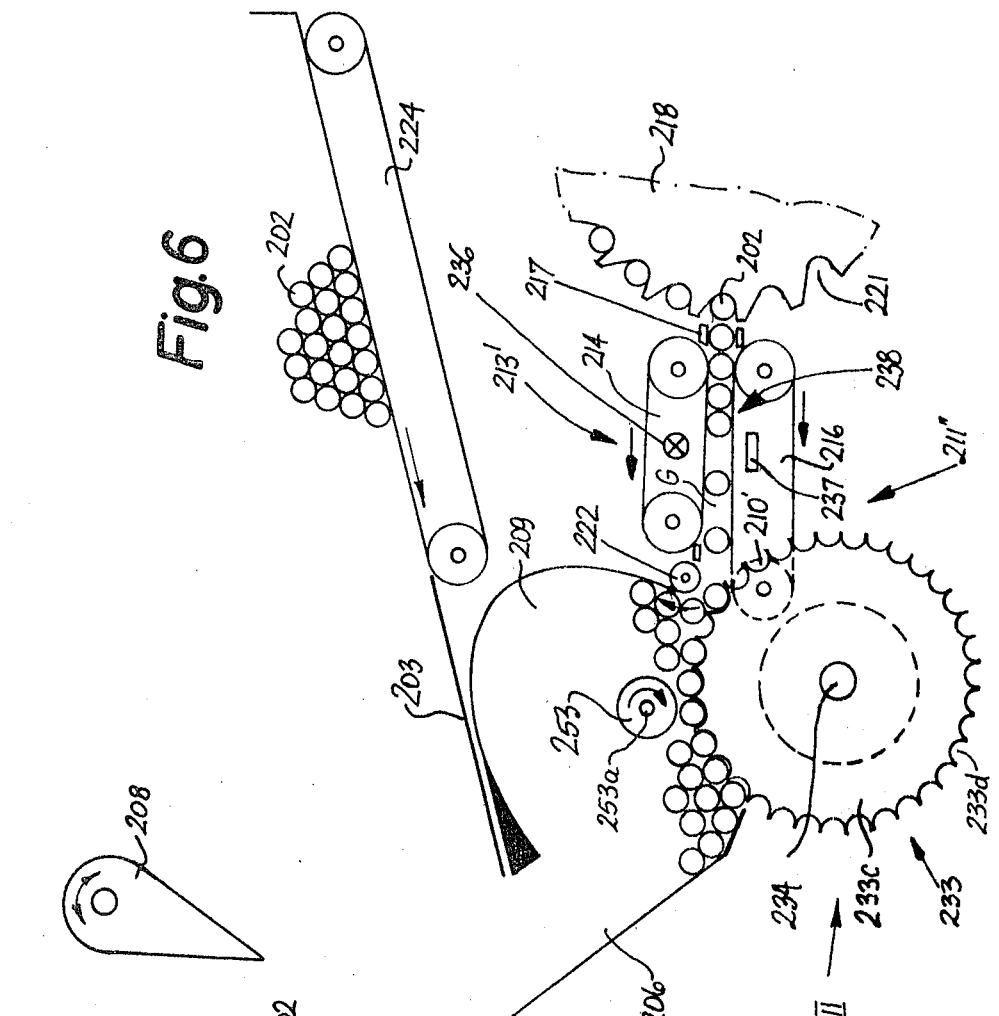
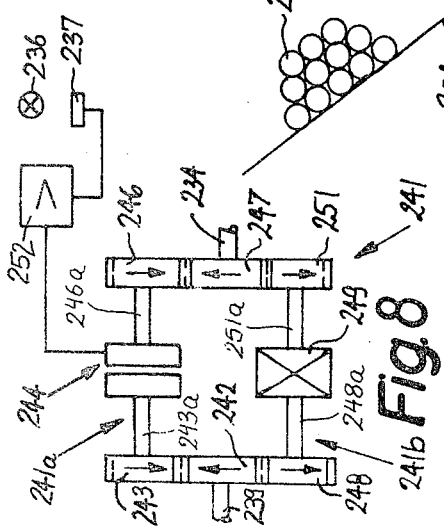
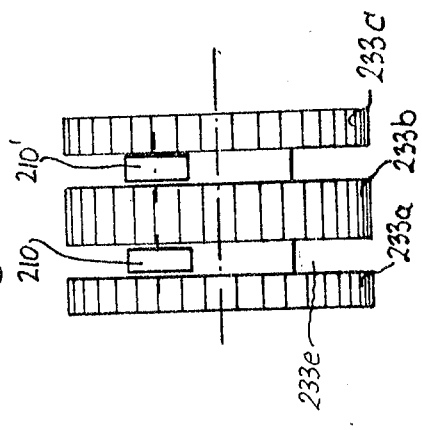

APPARATUS FOR TRANSFERRING ROD-SHAPED ARTICLES FROM A SOURCE OF SUPPLY INTO THE FLUTES OF A CONVEYOR

BACKGROUND OF THE INVENTION

The present invention relates to apparatus for manipulating rod-shaped articles, such as filter rod sections, plain or filter tipped cigarettes, cigarillos, cigars or analogous commodities which constitute or form part of rod-shaped smokers' products. More particularly, the invention relates to improvements in apparatus for transporting rod-shaped articles, especially (but not necessarily) filter rod sections of unit length or multiple unit length, from a magazine or another source of supply into flutes or analogous receiving means of a withdrawing or accepting conveyor. Still more particularly, the invention relates to improvements in apparatus for sidewise transport of rod-shaped articles (i.e., for transport at right angles to the longitudinal axes of the articles) between a source of supply and a withdrawing or accepting conveyor, for example, a rotary drum-shaped conveyor whose periphery is formed with axially parallel flutes for discrete rod-shaped articles.

Certain presently known apparatus are capable of delivering rod-shaped articles sideways from a magazine or another source of supply to the flutes of a rotating drum-shaped withdrawing or accepting conveyor with a reasonable degree of reliability, i.e., in such a way that each flute of the withdrawing conveyor is at least likely to receive a rod-shaped article. Many conventional apparatus which are used for such purposes comprise a magazine with an outlet which discharges a continuous or discontinuous stream of articles, preferably a multi-layer stream of rod-shaped articles which are of identical size and shape. Such apparatus further comprise a unit which feeds a single layer of articles from the outlet of the magazine into the path for the flutes of the withdrawing conveyor. A space for temporary storage of articles can be provided between the feeding unit and the outlet of the magazine, and an endless conveyor is used to constitute the bottom wall below such space. As mentioned above, the withdrawing conveyor normally constitutes or can constitute a rotary drum with peripheral flutes. The feeding unit delivers successive articles of the aforementioned layer into successive flutes of the rotating withdrawing conveyor. The just discussed apparatus are incapable of ensuring predictable delivery of rod-shaped articles into each and every flute of the rotating withdrawing conveyor when the latter is driven at an elevated speed.

U.S. Pat. No. 3,513,962 discloses an apparatus with a rotating withdrawing drum having peripheral flutes for reception and further transport of discrete rod-shaped articles. The magazine of the patented apparatus discharges a multi-layer stream which enters a channel whose bottom wall constitutes or includes an endless belt conveyor. The conveyor has an upper reach which is parallel to and extends below a plate-like guide all the way to the path for the flutes of the withdrawing conveyor. The speed of the belt conveyor is higher than the peripheral speed of the rotating withdrawing conveyor so that the articles which form a layer on the upper reach of the belt conveyor are caused to move nearer to each other and form a row of parallel articles which is normally free or which should be free of clearances between neighboring articles. The inlet to the flutes of the rotating withdrawing conveyor is defined by the aforementioned plate-like guide and the upper reach of the belt conveyor, i.e., the space between the belt conveyor and the guide accumulates a single layer of closely adjacent particles the foremost article of which is caused to enter the oncoming flute of the withdrawing conveyor. A refuser roll is provided at the upstream end of the just discussed space to prevent entry of more than one layer of articles. The patented apparatus is capable of forming a single layer of rod-shaped articles immediately adjacent to the path of movement of flutes on the withdrawing conveyor; however, it cannot ensure delvery of an article into each and every flute. To a certain degree, this is due to the fact that, when the withdrawing conveyor is driven at an elevated speed, the teeth between neighboring flutes (the flutes can be said to constitute tooth spaces between such teeth) act not unlike refusing or repelling means by tending to push the foremost article of the single layer back into the channel between the upper reach of the belt conveyor and the plate-like guide. Therefore, one or more flutes are likely to remain empty which can result in a substantial reduction of the output of the machine which receives articles from or which embodies the withdrawing conveyor. It has been found that, once the peripheral speed of the withdrawing conveyor reaches a given value, the patented transporting apparatus is highly likely to skip certain flutes so that the percentage of filled flutes downstream of the transfer station is relatively low. Since each rod-shaped article may constitute a filter plug of six or eight times unit length, the absence of a single filter rod section (i.e., the inability of the patented apparatus to fill one of the flutes during each revolution of the withdrawing conveyor) entails a loss of six or eight filter cigarettes of unit length. Since the output of a modern filter tipping machine is very high, this entails enormous losses in output within a relatively short interval of use.

The just discussed drawback of the patented apparatus cannot be eliminated by simply reducing the width of the gap between the upper reach of the aforementioned belt conveyor and the underside of the plate-like guide because this could lead to clogging of the gap and/or to deformation or even more pronounced damage to rod-shaped articles.

Commonly owned U.S. Pat. No. 3,603,445 to Zausch et al. discloses an apparatus which delivers cigarettes from a maker to a packing machine in such a way that the packing machine can accumulate arrays of cigarettes which are ready for introduction into packs. The machine utilizes drum-shaped and/or belt-like conveyors with flutes for transport of cigarettes from the maker to the processing machine in such a way that one or more rows of articles are converted into groups or arrays each of which normally contains twenty cigarettes.

OBJECTS AND SUMMARY OF THE INVENTION

An object of the invention is to provide a novel and improved apparatus which can deliver rod-shaped articles, particularly rod-shaped articles which constitute or form part of smokers' products, into the flutes of a withdrawing or accepting conveyor in such a way that the likelihood of leaving one or more flutes unfilled is either remote or eliminated regardless of the speed at which the articles are transported to the withdrawing conveyor and irrespective of the speed at which the flutes are caused to advance along their path.

Another object of the invention is to provide the apparatus with novel and improved means for preventing the teeth between neighboring flutes of the withdrawing or accepting conveyor for interfering with the delivery of articles into flutes that immediately follow such teeth.

A further object of the invention is to provide the apparatus with novel and improved means for reducing the likelihood of deformation of and/or other damage to the articles on their way to the path for the flutes.

An additional object of the invention is to provide an apparatus which can be used with advantage to transport filter rod sections of multiple unit length into the flutes of a rotary drum-shaped withdrawing or accepting conveyor.

Another object of the invention is to provide a processing or consuming machine which embodies the above outlined apparatus.

A further object of the invention is to provide the apparatus with novel and improved means for maintaining an adequate supply of rod-shaped articles upstream of the region where the apparatus begins to form a single layer ahead of the path of movement of flutes on the withdrawing conveyor.

An additional object of the invention is to provide the apparatus with novel and improved means for preventing clogging of the outlet of a magazine or another source of supply of rod-shaped articles with articles which await admission or introduction into the flutes of the withdrawing conveyor.

The apparatus which embodies the present invention is utilized to manipulate rod-shaped articles (such as filter rod sections) which constitute or form part of smokers' products and have predetermined diameters. The apparatus comprises a source containing a supply of substantially parallel articles and having outlet means serving to discharge articles in such a way that the articles move sideways (i.e., at right angles to their longitudinal axes), a driven withdrawing conveyor having a plurality of article-receiving flutes arranged to move along a predetermined path, and a transfer conveyor system for delivering articles from the outlet means into successive flutes of the withdrawing conveyor. The transfer conveyor system comprises a receiving conveyor which receives articles from the outlet means and serves to move the articles sideways toward the path of the flutes, a feeding unit which is interposed between the receiving conveyor and the path of the flutes and includes a pair of conveyors which define an elongated gap having a width at most equal to the diameter of an article so that the articles which are delivered by the receiving conveyor form in the gap a single layer successive articles of which are admitted into successive flutes of the withdrawing conveyor as a result of forcible engagement between their external surfaces and the conveyors of the feeding unit, and means for driving the receiving conveyor and at least one of the conveyors in the feeding unit at different speeds. The arrangement is normally such that the speed of both coneyors in the feeding unit exceeds the speed of the receiving conveyor and the speed of the receiving conveyor equals or exceeds the speed at which the flutes are moved along their path.

The apparatus preferably further comprises means which defines a pileup zone or temporary storage zone for articles which have left the outlet means and are about to enter the gap between the conveyors of the feeding unit. The receiving conveyor is adjacent to the underside of the pileup zone.

In accordance with a presently preferred embodiment of the invention, the conveyors of the feeding unit include a conveyor which is at least substantially aligned with the receiving conveyor and receives articles therefrom. Such aligned conveyor is invarably driven at a speed which exceeds the speed of the receiving conveyor and also the speed of the flutes.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 is a schematic front elevational view of an apparatus which constitutes a further modification of the apparatus shown in FIG. 2;

FIG. 7 is an end elevational view of a fluted drum-shaped conveyor in the apparatus of FIG. 6, substantially as seen in the direction of arrow VII in FIG. 6; and FIG. 8 is a diagrammatic view of the drive means for the conveyor of FIG. 7.

DESCRIPTION OF THE PREFERRED EKMBODIMENTS

Figure 1:
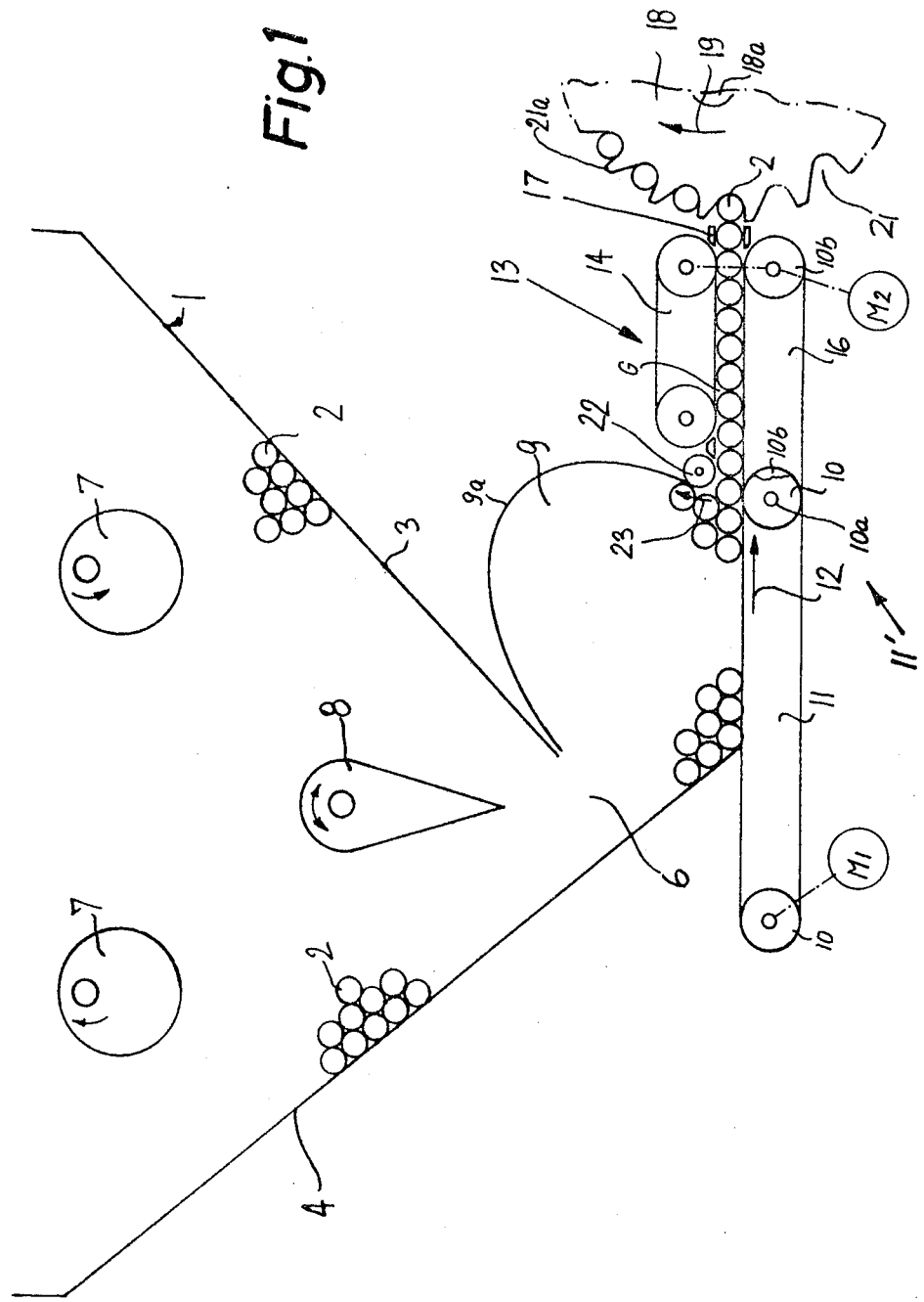
FIG. 1 is a schematic front elevational view of an apparatus which embodies one form of the invention.

Referring first to FIG. 1, there is shown an apparatus which comprises a funnel-shaped magazine 1 constituting a main source of supply of rod-shaped article 2 which are filter rod sections. However, the magazine 1 can also store a supply of plain or filter cigarettes, cigars or cigarillos. The walls 3 and 4 of the magazine 1 converge downwardly toward an outlet 6 which allows the rod-shaped articles 2 (hereinafter called articles) to descend onto the upper reach of an endless belt conveyor 11 forming part (namely, the receiving conveyor) of a transfer conveyor system 11' serving to deliver rod-shaped articles 2 from the outlet 6 into the peripheral flutes 21 of a drum-shaped withdrawing or accepting conveyor 18 which is continuously driven to rotate in the direction indicated by the arrow 19.

Several eccentric rollers 7 in the interior of the magazine serve to agitate the contents of the magazine 1 so as to promote the gravitational descent of such articles toward and beyond the outlet 6. An oscillating pendulum-type element 8 immediately or closely above the outlet 6 serves a similar purpose; primarily, the element 8 is to agitate and loosen the supply of articles 2 above the outlet 6 so as to prevent or to reduce the likelihood of bridging of articles in the lower part of the magazine 1. The means for rotating the eccentric rollers 7 and/or for oscillating the element 8 is not specifically shown in FIG. 1.

The belt conveyor or receiving conveyor 11 of the transfer conveyor system 11' is located at a level below a pileup zone 9 which is immediately adjacent to and communicates with the outlet 6. The purpose of the zone 9 is to temporarily store articles 2 which are incapable of entering a feeding unit 13 forming part of the transfer conveyor system 11' and serving to deliver the articles 2 directly into successive flutes 21 of the withdrawing conveyor 18. A mouthpiece 17 is preferably interposed between the discharge end of the feeding unit 13 and the path of orbital movement of flutes 21 about the axis of the withdrawing conveyor 18. The upper reach of the belt conveyor 11 constitutes the moving bottom wall of the pileup zone 9. This upper reach travels in the direction indicated by arrow 12.

The feeding unit 13 comprises two cooperating belt conveyors 14 and 16 which are disposed at the opposite sides of the path for transfer of articles 2 from the upper reach of the belt conveyor 11 into the path of orbital movement of the flutes 21. The upper reach of the lower belt conveyor 16 is coplanar with the upper reach of the belt conveyor 11, and the lower reach of the upper belt conveyor 14 is spaced apart from the upper reach of the belt conveyor 16 so as to define therewith a clearance or gap G having a width (i.e., a height, as viewed in FIG. 1) which is slightly less than the diameter of an article 2. This ensures that the belt conveyors 14 and 16 can positively entrain successive articles 2 which reach the discharge end of the conveyor 11 and transport such articles toward the withdrawing conveyor 18. The belt conveyor 16 can be said to constitute a downstream extension of the belt conveyor 11.

The shaft 10a at the right-hand end turn of the belt conveyor 11 carries two spaced-apart pulleys 10 for the two discrete endless belts of the conveyor 11. The two endless belts are located in two parallel vertical planes at such a distance from each other that each thereof engages the respective end portions of the wrappers of the articles 2 resting on the conveyor 11. The belt conveyor 16 is a relatively wide endless belt which is trained about two pulleys 10b. The left-hand pulley 10b is mounted on the shaft 10a between the pulleys 10 for the belts of the conveyor 11. In other words, whereas the belts of the conveyor 11 engage the end portions of articles 2 which are to be transferred from the outlet 6 toward the gap G between the conveyors 14, 16 of the feeding unit 13, the lower conveyor 16 of the feeding unit 13 engages the median portions of articles which travel between the conveyors 14 and 16.

It goes without saying that the conveyor 11 may comprise a single belt and the conveyor 16 may comprise two discrete belts which are disposed in spaced-apart parallel vertical planes. Furthermore, it is equally possible to assemble the conveyor 11 of several discrete belts and to assemble the conveyor 16 of several discrete belts which alternate with the belts of the conveyor 11.

The left-hand pulley 10 or the right-hand pulleys 10 are freely rotatable on the shaft 10a because the conveyor 11 is intended to transport the articles 2 at a speed which deviates from the speed of the upper reach of the conveyor 16. The speed of the upper reach of the conveyor 16 matches the speed of the lower reach of the conveyor 14.

The mouthpiece 17 is interposed between the discharge end of the feeding unit 13 and the path of orbital movement of flutes 21 about the axis of the withdrawing conveyor 18. This mouthpiece ensures or promotes satisfactory orientation of successive articles 2 on their way into the oncoming flutes 21.

The means for driving the receiving conveyor 11 at a speed which equals or exceeds the speed of the flutes 21 includes a first motor M1. A second motor M2 drives the belt conveyors 14, 16 of the feeding unit 13 at a speed exceeding the speed of the receiving conveyor 11. The means for driving the withdrawing conveyor 18 at a predetermined speed includes the shaft 18a.

The operation of the apparatus which is shown in FIG. 1 is as follows:

The width of the outlet 6 is selected in such a way that the magazine 1 can supply a multi-layer stream of parallel articles 2 onto the upper reach of the conveyor 11 whose upper reach travels in the direction indicated by the arrow 12. The conveyor 11 delivers the articles 2 into the inlet of the feeding unit 13 where the articles are engaged by the adjacent reaches of the conveyors 14, 16 and are transported toward and through the mouthpiece 17 for admission or introduction into successive flutes 21 of the withdrawing conveyor 18. The withdrawing conveyor 18 transports the articles 2 to a further destination, for example, into the range of one or more rotating knives which subdivide successive articles into filter plugs of desired length. Such filter plugs can be used for the manufacture of filter cigarettes of unit length or multiple unit length. A filter-tipping machine which can utilize or embody the conveyor 18 is known as MAX S and is produced and distributed by the assignee of the present application.

As long as the conveyor 11 can deliver an uninterrupted row of articles 2 which form a single layer of closely adjacent articles traveling at right angles to their respective axes, the peripheral speed of the withdrawing conveyor 18 can match the speed of travel of conveyors 14, 16 in the feeding unit 13. However, it has been found that the articles 2 which are transported through the feeding unit 13 are not likely to always form a layer without any spaces between neighboring articles. This holds especially true at elevated speeds of the withdrawing conveyor 18, for example, when the conveyor 18 forms part of a machine serving to turn out in excess of 6,000 cigarettes per minute. At such times, synchronous movement of the withdrawing conveyor 18 and of the conveyors 14, 16 in the feeding unit 13 could not ensure reliable introduction of a discrete article 2 into each and every flute 21 of the conveyor 18. The absence of articles 2 in certain flutes 21 could adversely influence the operation of the machine which embodies or cooperates with the withdrawing conveyor 18. For example, if the conveyor 18 is to deliver filter rod sections (articles 2 of six times unit length) to the severing station of a filter tipping machine, the absence of a single article 2 can entail a loss of six filter cigarettes of unit length and attendant losses in tobacco of the plain cigarettes which were to be united with the filter plugs of the missing article 2.

In accordance with a feature of the invention, the speed of the belt conveyors 14 and 16 in the feeding unit 13 exceeds the peripheral speed of the withdrawing conveyor 18. This guarantees the formation of a pileup or layer of articles 2 between the neighboring reaches of the conveyors 14, 16 so that the feeding unit 13 can compensate for eventual absence of regular delivery of articles from the conveyor 11 into the gap G between the conveyors 14 and 16. The reference character 22 denotes a refuser roller which is disposed between the pileup zone 9 and the left-hand end turn of the upper conveyor 14 in the feeding unit 13. The refuser roller 22 rotates in the direction which is indicated by the arrow 23 to promote the formation of a single layer of immediately adjacent parallel articles 2 in the space (gap G) between the neighboring reaches of the conveyors 14 and 16.

Another advantage of the feature that the conveyors 14, 16 are driven at a speed exceeding the peripheral speed of the withdrawing conveyor 18 is that the conveyors 14 and 16 tend to force or urge successive articles 2 through the mouthpiece 17 and into the oncoming flutes 21 of the conveyor 18. This also contributes to reliable filling or successive flutes 21 with articles 2. Such forcible feeding or introduction of articles 2 into successive flutes 21 is especially desirable when the conveyor 18 is driven at an elevated or very high speed. It should be noted that the projections or teeth 21a between successive flutes 21 of the conveyor 18 exhibit a tendency to push the article 2 between the upper and lower sections of the mouthpiece 17 in a direction to the left, as viewed in FIG. 1, i.e., back into the gap between the conveyors 14 and 16. The tendency of the conveyors 14 and 16 to urge or bias successive articles 2 toward the periphery of the withdrawing conveyor 18 reduces the likelihood that the teeth 21a would succeed in pushing an article 2 from the interior of the mouthpiece 17 back into the feeding unit 13. It has been found that the just discussed feature of driving the conveyors 14, 16 of the feeding unit 13 at a speed which exceeds the peripheral speed of the conveyor 18 ensures complete filling of all flutes 21 with discrete articles 2, even when the withdrawing conveyor 18 is rotated at a very high speed such as is necessary in modern high-speed processing machines which produce or treat rod-shaped articles constituting or forming part of smokers' products.

The speed of the receiving belt conveyor 11 below the outlet 6 of the magazine 1 is preferably selected in such a way that it exceeds the peripheral speed of the withdrawing conveyor 18 but is less than the speed of the conveyors 14, 16 in the feeding unit 13. This ensures that the conveyor 11 can invariably supply articles 2 at a rate which is necessary to form in the gap G a layer of immediately or closely adjacent (normally touching) neighboring articles which are pushed toward and through the mouthpiece 17 and into the oncoming flutes 21. It is not absolutely necessary that the speed of the conveyors 14, 16 exceed the speed of the conveyor 11. If the rate at which the conveyor 11 delivers articles 2 toward the receiving end of the feeding unit 13 exceeds the rate at which the unit 13 transfers articles 2 into the flutes 21 of the withdrawing conveyor 18, the surplus of articles 2 which have descended below the outlet 6 but cannot enter the gap G accumulates in the pileup zone 9 above the upper reach of the conveyor 11. Such situation can develop when the gap G is filled with articles 2 (this is illustrated in FIG. 1). The purpose of the aforementioned refuser roller 22 (which rotates in the direction of the arrow 23) is to promote entry of the surplus of the articles 2 into the interior of the pileup zone 9. This zone is bounded in part by the upper reach of the conveyor 11, in part by an arcuate hood 9a, and in part by the lower portion of the wall 3 of the magazine 1. The hood 9a can but need not be integral with the lower portion of the wall 3. It will be noted that the configuration of the hood 9a prevents the articles 2 which cannot immediately enter the gap G from piling up in a direction toward the outlet 6. Such accumulation of articles in the zone 9 would be undesirable because the accumulated articles 2 could clog the outlet 6. The concave internal surface of the hood 9a above the refuser roller 22 enables the articles which are yet to enter the gap G to accumulate at the lower portion of the hood 9a and the accumulation can reach the outlet 6 only when the zone 9 is filled or practically filled with articles 2.

The configuration and provision of the zone 9 also contribute to satisfactory filling of the flutes 21 with articles 2. Thus, the zone 9 can accumulate a sufficient supply of articles 2 to take up the slack if the outlet 6 temporarily fails to supply articles at a rate which is necessary to enable the feeding unit 13 to deliver an article 2 into each oncoming flute 21. The adjacent reaches of the conveyors 14 and 16 positively engage the articles 2 in the gap G so that such articles cannot yield to the teeth 21a and/or to eventual resistance of an article to movement through and beyond the mouthpiece 17.

Under ideal circumstances, it would suffice to drive the conveyors 11, 14 and 16 at the same speed which matches the peripheral speed of the withdrawing conveyor 18, i.e., the speed of travel of flutes 21 along their endless path. However, in actual practice, and especially when the withdrawing conveyor 18 is driven at a very high speed (such as is necessary in a modern mass-producing machine for the manufacture and/or processing of rod-shaped articles which constitute or form part of smokers' products), even slight deviations of neighboring articles 2 from positions of exact parallelism with each other (especially in the gap G) and/or even temporary bridging of articles in the magazine 1 above or at the outlet 6 will prevent the formation of a continuous layer of abutting articles in the gap G between the belt conveyors 14, 16 with the result that a number of flutes 21 will remain empty. The likelihood of absence of articles 2 in certain flutes which advance beyond the mouthpiece 17 is prevented by the novel expedient of driving the receiving conveyor 11 at a speed which is less than the speed of the conveyors 14, 16 in the feeding unit 13 but preferably at least equals the peripheral speed of the withdrawing conveyor 18, i.e., the belt conveyors 14, 16 of the feeding unit 13 are driven at a speed which exceeds the peripheral speed of the withdrawing conveyor 18. This invariably results in the formation of a layer of contiguous articles 2 in the gap portion immediately ahead of the mouthpiece 17 whereby the neighboring articles are compelled to assume positions of exact parallelism with each other as well as to ensure that they cannot be pushed back by successive teeth 21a of the withdrawing conveyor 18.

Figure 2:
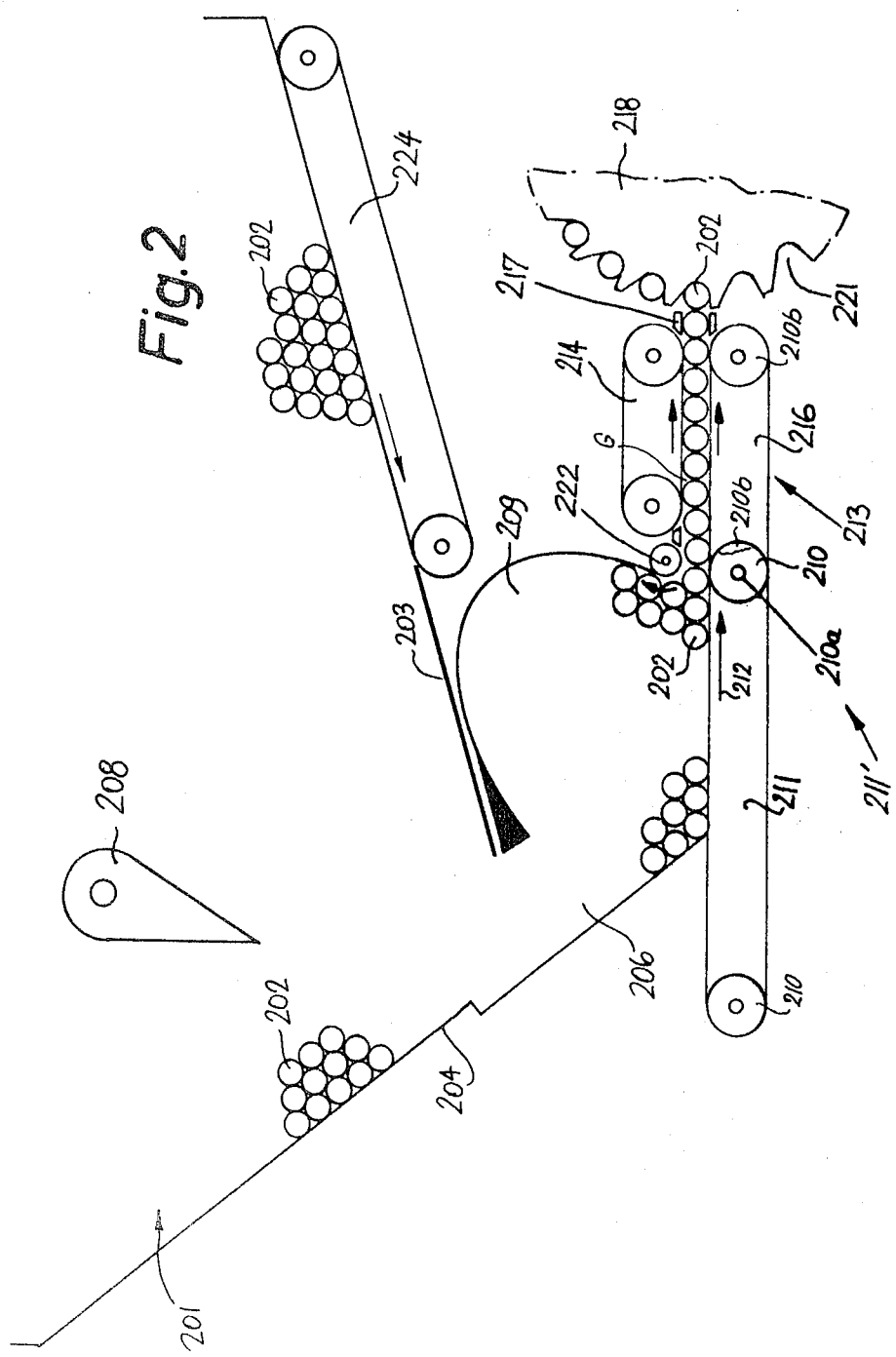
FIG. 2 is a similar schematic front elevational view of a second apparatus wherein a portion of the magazine constitutes a belt conveyor.

FIG. 2 illustrates a modified apparatus wherein all such parts which are identical with or clearly analogous to corresponding parts of the apparatus of FIG. 1 are denoted by similar reference characters plus 200. The articles 202 in the magazine 201 are parallel filter rod sections of multiple unit length. FIG. 2 merely shows the freely or forcibly oscillatable pendulum-type agitating and loosening element 208. However, it is clear that the magazine 201 can also accommodate one or more eccentric rollers of the type shown at 7 in the magazine 1 of FIG. 1. The wall 203 and/or 204 of the magazine 201 can be agitated in a manner which is not specifically shown in the drawing so as to further promote the gravitational descent of articles 202 toward and through the outlet 206 which is wide enough to allow for the passage of a multi-layer stream of parallel articles.

In order to further promote the transport of articles 202 in the magazine 201, i.e., toward the outlet 206, a portion of the agitated wall 203 is constituted by the upper reach of an endless belt conveyor 224 which is driven to advance in the direction indicated by arrow and to thus force the articles in the lowermost portion of the magazine 201 to advance sideways toward and into the outlet 206.

The provision of the just described vibrating walls 203, 204, of the oscillatable agitating and loosening element 208 and of the belt conveyor 224 reduces the likelihood of accumulation of an insufficient quantity of articles 202 on the upper reach of the first or receiving conveyor 211 of the transfer conveyor system 211'. The feature that the upper reach of the conveyor 211 invariably carries and advances a sufficient number of articles 202 also contributes to reliable filling of successive flutes 221 of the withdrawing conveyor 218 with rod-shaped articles 202. The construction of the feeding unit 213 is identical with that of the feeding unit 13 in the apparatus of FIG. 1. The same holds true for the component parts 217 and 222 as well as for the construction and configuration of the parts which constitute the pileup zone 209.

Figure 3:
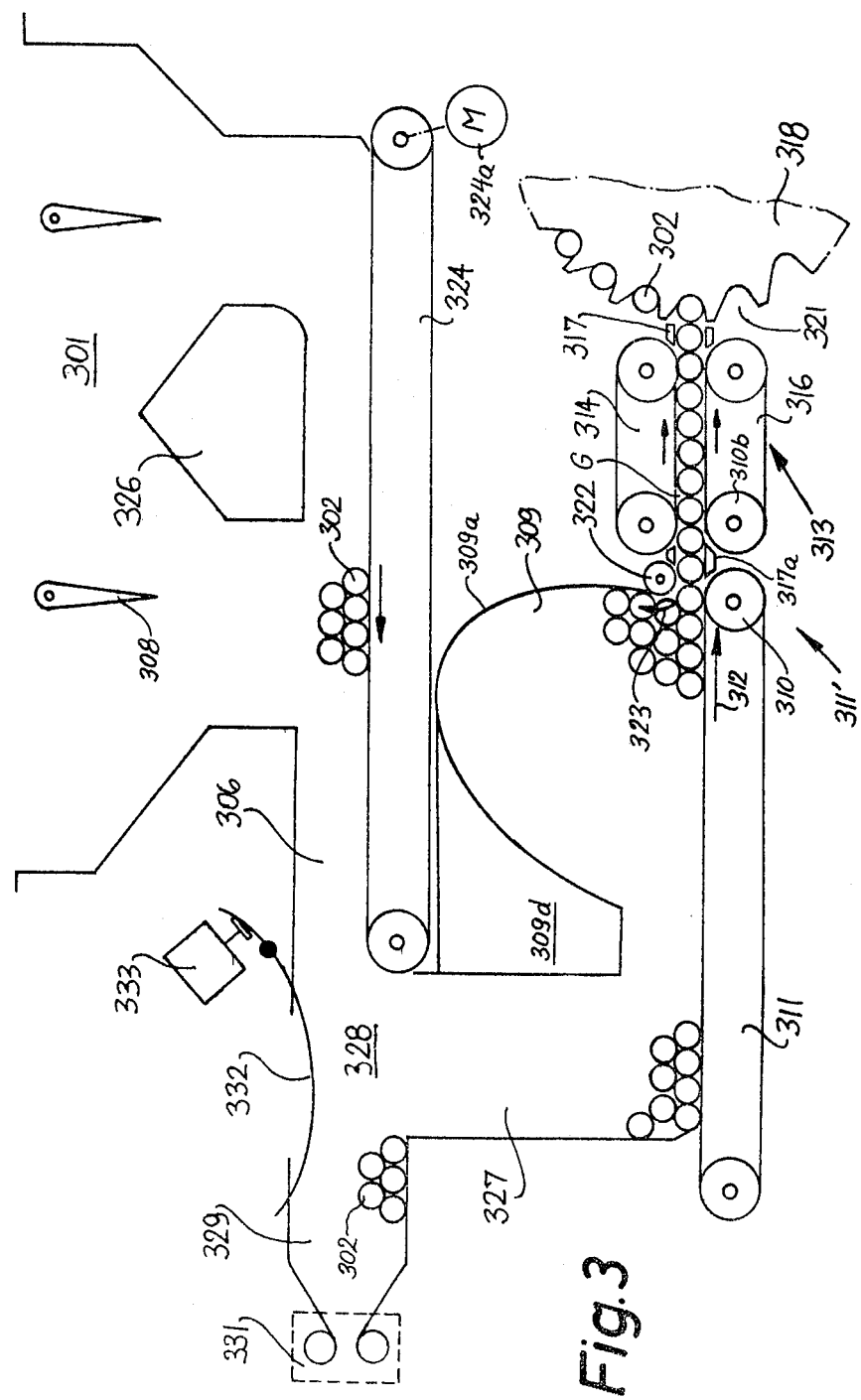
FIG. 3 is a schematic front elevational view of a third apparatus with a modified magazine and a separate source of rod-shaped articles for delivery to the feeding unit.

FIG. 3 illustrates a third apparatus wherein all such parts which are identical with or clearly analogous to corresponding parts of the apparatus of FIG. 1 are denoted by similar reference characters plus 300.

The magazine 301 contains a supply of parallel rod-shaped articles 302 and has an outlet 306 which is adjacent to the left-hand end turn of a horizontal belt conveyor 324 constituting a mobile bottom wall of the magazine. The interior of the magazine 301 accommodates several oscillating or oscillatable pendulum-type elements 308 as well as a suitably configured (roof-shaped) relieving or shielding device 326 which protects the articles 302 on the upper reach of the belt conveyor 324 from damage or deformation under the weight of the mass of parallel articles 302 in the upper portion of the magazine 301.

The outlet 306 discharges a multi-layer stream of parallel articles 302 into a vertical or nearly vertical channel 327 which is wide enough to accommodate a multi-layer stream and delivers the articles onto the upper reach of the first or receiving conveyor 311 of the transfer conveyor system 311'. The pileup zone 309 is disposed above the upper reach of the conveyor 311 but is practically completely separated from the channel 327 by a partition 309d so that the articles 302 which accumulate in the zone 309 are not likely to influence or oppose downward movement of the articles in the channel 327 and onto the left-hand portion of the receiving conveyor 311. The just described positioning of the zone 309 with reference to the channel 327 ensures that the feeding unit 313 cannot oppose the discharge of a multi-layer stream of articles 302 from the interior of the magazine 301 and onto the first conveyor 311 of the transfer conveyor system 311'.

The configuration of the hood 309a is similar to that of the hood 9a, i.e., the refuser roller 322 at the receiving end of the feeding unit 313 (this roller rotates in the direction indicated by the arrow 323) can steer the surplus of articles 302 against the concave inner side of the hood 309a in the proximity of the right-hand end turn of the first conveyor 311. The provision of a pileup zone 309 which is separated from the channel 327 by the partition 309d further ensures that the articles 302 in the gap G between the conveyors 314, 316 of the feeding unit 313 are not subjected to excessive pressure or other forces arising as a result of accumulation of larger or smaller quantities of parallel articles 302 on the upper reach of the conveyor 311. The absence of mechanical stressing of articles in the gap G or immediately upstream of such gap is desirable and advantageous because it contributes to higher quality of the ultimate products. Thus, a deformed filter plug is not likely to form a fluid-tight seal with a plain cigarette so that a filter cigarette embodying such a plug will admit excessive quantities of atmospheric air when it is lighted and the smoker draws a column of tobacco smoke into his or her mouth.

The manner in which the articles 302 are transported through the gap G of the feeding unit 313 and mouthpiece 317 to enter the oncoming flutes 321 of the withdrawing conveyor 318 is the same as described in connection with the apparatus of FIG. 1.

FIG. 3 further shows a receiver 331 which is adjacent to the inlet of a supply duct 329 serving to deliver filter plugs or analogous rod-shaped articles 302 into a junction 328 between the outlet 306 of the magazine 301 and the upper end of the channel 327. The receiver 331 can accept filter plugs directly from the discharge end of a pneumatic conveyor which, in turn, receives articles 302 from the sender of an apparatus serving to deliver rod-shaped articles from a maker (for example, a machine for the production of filter rod sections) or from a reservoir system (for example, a reservoir system known as RESY and manufactured by the assignee of the present application). A receiver which can be utilized in the apparatus of FIG. 3 is disclosed, for example, in commonly owned U.S. Pat. No. Re 28,383 granted Apr. 8, 1975 to Willy Rudszinat. The disclosure of this patent is incorporated herein by reference.

The junction 328 between the outlet 306, supply duct 329 and channel 327 is overlapped by a pivotable sensor 332 which can actuate a signal generator 333. In normal operation, the articles 302 which enter the channel 327 are delivered by the supply duct 329. If the receiver 331 fails to receive articles at a desired rate or fails to receive any articles, the sensor 332 pivots in a counterclockwise direction, as viewed in FIG. 3, and causes the signal generator 333 to start a motor 324a for the bottom conveyor 324 of the magazine 301. Thus, the magazine 301 begins to deliver articles 302 into the channel 327 as soon as the channel 327 ceases to receive articles from the supply duct 329 or as soon as the duct 329 fails to supply articles at a rate which is necessary to fill each and every flute 321 of the withdrawing conveyor 318.

The provision of the supply duct 329 constitutes an additional safety feature to ensure that the flutes 321 of the withdrawing conveyor 318 are filled with articles 302 regardless of whether such articles arrive by way of the receiver 331 and/or by way of the magazine 301. As stated before, under normal circumstances, the receiver 331 can deliver articles 302 toward and into the channel 327 so that the articles which are fed into the flutes 321 come directly from the maker of such articles. The articles 302 in the magazine 301 constitute a reserve which is relied upon when the rate of delivery via receiver 331 is too low or equals zero.

It will be noted that, in the apparatus of FIG. 3, the left-hand pulley or pulleys 310b for the conveyor 314 are spaced apart from the right-hand pulley or pulleys 310 for the receiving conveyor 311. The space between such pulleys accommodates a second mouthpiece 317a which is located immediately downstream of the refuser roller 322 and defines a passage whose width can slightly exceed the diameter of an article 302.

Figure 4:
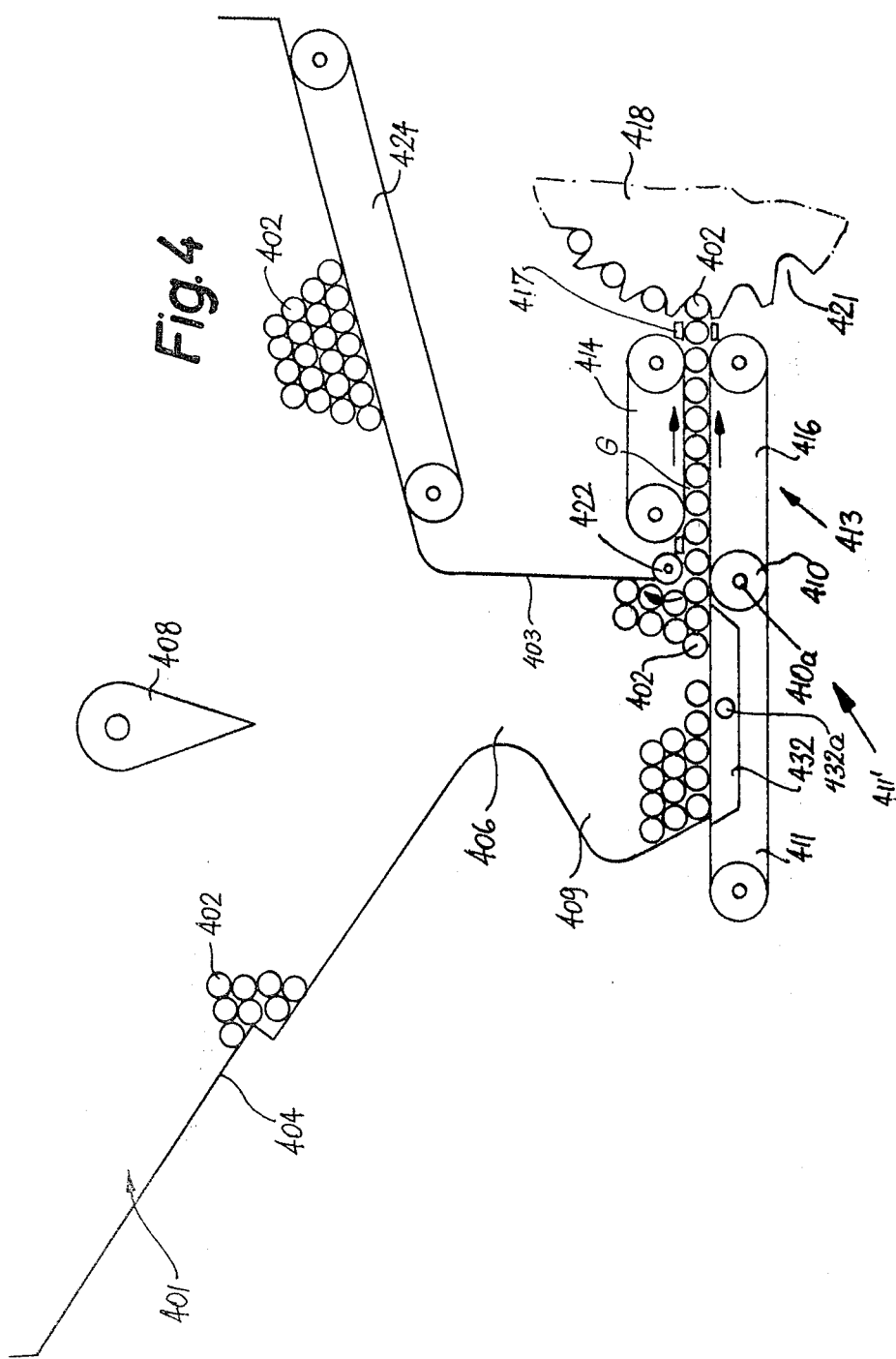
FIG. 4 is a schematic front elevational view of an apparatus which constitutes a modification of the apparatus shown in FIG. 2.

The embodiment which is illustrated in FIG. 4 is similar to the apparatus of FIG. 2. All such parts of this embodiment which are identical with or clearly analogous to corresponding parts of the apparatus of FIG. 1 are denoted by similar reference characters plus 400. The main difference between the embodiments of FIGS. 2 and 4 is that the outlet 406 of the magazine 401 is nearer to the left-hand end turn of the upper conveyor 414 of the feeding unit 413 and that the pileup zone 409 is remote from the refuser roller 422. Thus, the articles 402 which descend from the magazine 401 via outlet 406 can reach the upper stretch of the first or receiving conveyor 411 in the transporting conveyor system 411' between the zone 409 and the feeding unit 413. Such mode of delivering articles 402 from the magazine 401 does not interfere with orderly and predictable transfer of articles into the gap G between the conveyors 414, 416 because the first conveyor 411 forms part of a suction conveyor which further comprises a suction chamber 432 serving to attract the descending articles 402 against the upper reach of the conveyor 411. This ensures reliable advancement of articles 402 with the upper reach of the conveyor 411 and on toward and into the gap G.

The suction chamber 432 can have a perforated top wall or it may be open at the top if the belts of the conveyor 411 are sufficiently permeable to air. The connection of the chamber 432 with a suitable suction generating device (not shown) is established by way of a conduit 432a. It has been found that the provision of the suction chamber 432 ensures the formation of a supply of articles 402 on the conveyor 411 so that this conveyor can deliver an uninterrupted row or layer of articles into the left-hand end of the gap G between the conveyors 414, 416 of the feeding unit 413.

In all other respects, the operation of the apparatus of FIG. 4 is identical with or clearly analogous to that of the apparatus of FIGS. 1 or 2. The wall 203 of FIG. 2 is replaced with a substantially vertical wall 403 which extends downwardly toward the periphery of the refuser roller 422.

Figure 5:
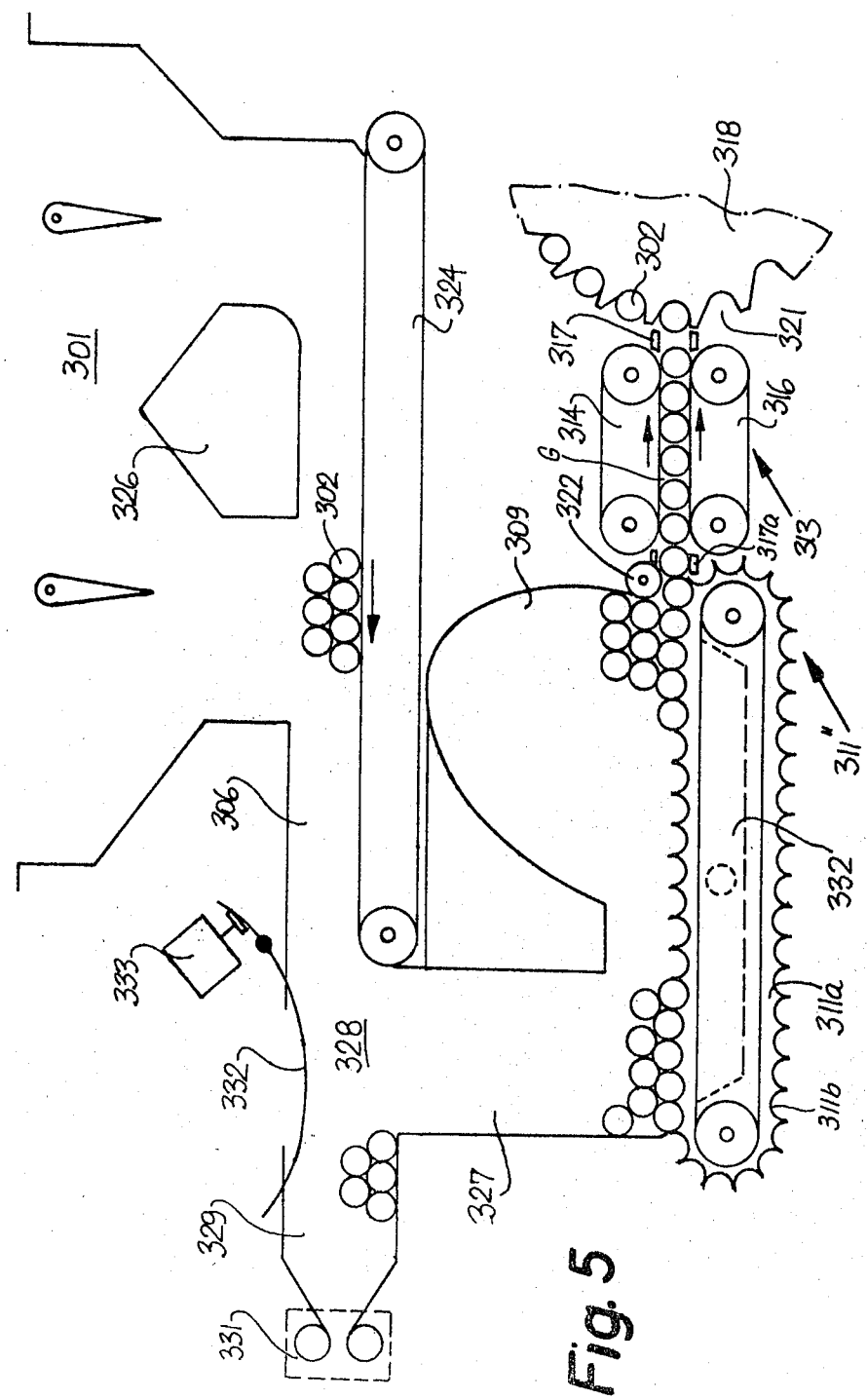
FIG. 5 is a schematic front elevation view of an apparatus which constitutes a modification of the apparatus shown in FIG. 3.

The apparatus of FIG. 5 is similar to the apparatus of FIG. 3. All such parts of the apparatus of FIG. 5 which are identical with or clearly analogous to those in the apparatus of FIG. 3 are denoted by similar reference characters. In order to ensure more predictable delivery of articles 302 from the channel 327 into the gap G, the apparatus of FIG. 5 comprises a receiving conveyor 311a which is formed with transverse flutes or receiving means 311b for discrete articles 302. Furthermore, the upper reach of the conveyor 311a (which is foraminous) travels above a suction chamber 332 which attracts the articles 302 into the adjacent flutes 311b to further reduce the likelihood of irregular delivery of articles into the gap G between the conveyors 314, 316 of the feeding unit 313. The reference character 313'' denotes the transfer conveyor system which embodies the modified receiving conveyor 311a.

Aside from the just outlined modifications, the construction and mode of operation of the apparatus of FIG. 5 are analogous to those of the apparatus shown in FIG. 3. The main difference is that the formation of an orderly row of parallel rod-shaped articles 302 is transferred into the region below the discharge end of the channel 327 so that the apparatus of FIG. 5 is even more likely to furnish the feeding unit 313 with a continuous supply of rod-shaped articles whose orientation is identical with the desired orientation of articles 302 that are about to enter the oncoming flutes 321 of the withdrawing conveyor 318.

FIG. 6 illustrates a further apparatus which constitutes a modification of the apparatus shown in FIGS. 2 and 4, especially a modification of the apparatus of FIG. 2. All such parts of this apparatus which are clearly analogous to or identical with those of the apparatus of FIG. 2 are denoted by similar reference characters.

The first or receiving conveyor 211 of the transfer conveyor system 211' of FIG. 2 is replaced with a fluted drum-shaped receiving conveyor 233 forming part of a transfer conveyor system 211'' which further includes a feeding unit 213' with conveyors 214, 216 and a mouthpiece 217. As shown in FIG. 7, the fluted drum-shaped receiving conveyor 233 comprises three spaced-apart coaxial discs 233a, 233b, 233c with aligned axially parallel peripheral flutes 233d. The pulleys 210 and 210' for the endless belts of the lower conveyor 216 in the feeding unit 213' are disposed in the spaces 233e between the discs 233a–233c of the receiving conveyor 233. The positions of the pulleys 210, 210' are selected in such a way (note FIG. 6) that successive flutes 233d of the discs 233a–233c can deposit articles 202 onto the upper reaches of the belts forming part of the conveyor 216 whereby the latter entrains the articles 202 into the gap G. A filling and orienting roll 253 above the apex of the receiving conveyor 233 is rotated by a suitable prime mover including the shaft 253a so as to properly orient the articles 202 which are to enter the flutes 233d therebelow. The purpose of the roll 253 is to eliminate eventual minor absences of exact parallelism between neighboring articles 202 in the pileup zone 209 and to thus further reduce the likelihood that a set of aligned empty flutes 233d would advance toward and past the pulleys 210 and 210'.

The feeding unit 213' is adjacent to a monitoring device here shown as a photocell including a light source 236 and a photoelectronic transducer 237. These parts are mounted in such a way that they can monitor a portion of the gap G and the transducer 237 transmits a suitable signal on detection of articles 202 between its light-sensitive top face and the light source 236. In other words, the detector or monitoring means 236, 237 ascertains the length of the row or layer 238 of articles 202 in the gap G immediately upstream of the mouthpiece 217.

The width of the gap G is less than the diameter of an article 202 so that each article which is admitted into this gap is positively engaged by the conveyors 214, 216 and is transported toward and through the mouthpiece 217. The speed of the conveyors 214, 216 in the feeding unit 213' exceeds the peripheral speed of the withdrawing or accepting conveyor 218, i.e., the upper reach of the conveyor 216 and the lower reach of the conveyor 214 move faster than the flutes 221. This normally results in the formation of a layer 238 of closely adjacent (contacting) parallel articles 202 immediately upstream of the mouthpiece 217. The transducer 237 of the photocell 236, 237 transmits a signal when the length of the layer 238 increases sufficiently to interrupt the light beam which is emitted by the source 236. The signal from the transducer 237 entails a reduction in the angular velocity of the fluted receiving conveyor 233 which is normally driven at a speed such that the velocity of the flutes 233d exceeds the velocity of the flutes 221. As a rule, the angular velocity of the fluted receiving drum 233 is sufficiently high to ensure that eventual failure to fill all of those flutes 233d which face the outlet 206 and the pileup zone 209 does not reduce the length of the layer 238 to zero, i.e., that each and every flute 221 of the withdrawing conveyor 218 can receive an article 202 even if certain flutes 233d approaching the upper reaches of belts forming part of the conveyor 216 do not contain any articles. Otherwise stated, the receiving conveyor 233 is supposed to deliver at least as many articles 202 per unit of time as the number of flutes 221 which advance past the mouthpiece 217 per same unit of time. If the number of articles 202 which the receiving conveyor 233 supplies per unit of time into the gap G exceeds the number of flutes 221 that advance past the mouthpiece 217 during the same interval of time, the length of the layer 238 increases so that the articles 202 of this layer cause the transducer 238 to generate a signal which initiates a reduction in the speed of the receiving conveyor 233 in a manner as shown in FIG. 8. The speed of the receiving conveyor 233 is then reduced so that the speed of the flutes 233d matches or closely approximates that of the flutes 221. When the length of the layer 238 is reduced so that the light beam issuing from the source 236 can reach the transducer 237, the speed of the conveyor 233 is again increased so that the peripheral speed of its discs 233a–233c exceeds the peripheral speed of the withdrawing conveyor 218. The same procedure is repeated again and again to thus ensure that the length of the layer 238 in the gap G is not unduly increased and to further ensure that the gap G invariably receives a sufficient number of articles 202 to fill each and every flute 221.

The drive means 241 (see FIG. 8) for the shaft 234 of the fluted receiving conveyor 233 comprises a power train with two branches 241a and 241b. The input member of the drive means 241 is a shaft 239 which drives a spur gear 242 in mesh with the spur gears 243, 248 of the respective branches 241a, 241b. The branch 241a further comprises a gear 246 in mesh with a gear 247 on the shaft 234 of the receiving conveyor 233 and an electromagnetic clutch 244 between the shafts 243a, 246a of the gears 243, 246. The clutch 244 is engaged in response to a signal from an amplifier 252 whose input receives signals from the transducer 237 of the photocell 236, 237. The ratio of the gears 246 and 247 is selected in such a way that the RPM of the gear 247 exceeds the RPM of the gear 242. When the clutch 244 is engaged (i.e., when the length of the layer 238 in the gap G between the conveyors 214, 216 of the feeding unit 213' is not excessive), the gear 247 receives torque from the shaft 239 via gear 243, clutch 244 and gear 246 so that the receiving conveyor 233 is driven at a peripheral speed which exceeds the peripheral speed of the withdrawing conveyor 218.

The second branch 241b of the drive means 241 comprises the aforementioned gear 248, its shaft 248a, a gear 251 which meshes with the gear 247 on the shaft 234 of the receiving conveyor 233, a shaft 251a which carries the gear 251 and is coaxial with the shaft 248a, and an overrunning or freewheeling clutch 249 between the shafts 248a, 251a. When the clutch 244 is disengaged, i.e., when the gear 246 does not receive torque from the gear 243, the gear 248 rotates the gear 251 through the medium of the clutch 249 and the gear 251 rotates the gear 247 which drives the shaft 234 for the receiving conveyor 233 at a speed such that the velocity of the flutes 233d matches the velocity of the flutes 221. In other words, the speed ratio of the shafts 239, 234 is then one-to-one or any other ratio which ensures that the speed of the shaft 234 is less than when the latter receives torque via clutch 244. Such situation arises when the clutch 244 is disengaged in response to a signal from the transducer 237, i.e., when the length of the layer 238 in the gap G of the feeding unit 213' is excessive. Once the length of the layer 238 is reduced so that the transducer 237 ceases to transmit a signal, the clutch 244 is reengaged and causes the gear 246 to drive the shaft 234 at a higher speed so that the velocity of the flutes 233d exceeds that of the flutes 221. Since the clutch 249 is an overrunning clutch, it does not interfere with rotation of the gear 251 at a higher speed as soon or as long as the clutch 244 is engaged.

The drive 241 means of FIG. 8 ensures that the length of the layer 238 cannot be unduly increased as well as that the length of this layer cannot be unduly reduced so that the feeding unit 213' would be incapable of supplying articles 202 into each flute 221 of the withdrawing conveyor 218. Excessive lengthening of the layer 238 (so that it would extend into the region of the refuser roller 222) is undesirable because the trailing end of a very long layer 238 could interfere with proper filling of flutes 233d on the receiving conveyor 233. In fact, such trailing end of a very long layer 238 could damage or destroy the articles 202 which are about to leave the flutes 233d in order to descend onto the conveyor 216 and/or could knock articles 202 out of filled flutes 233d in the space ahead of the locus where the flutes 233d deposit articles onto the conveyor 216.

The rotary drum-shaped receiving conveyor 233 of FIGS. 6 and 7 can rotate around a stationary suction chamber (not shown) which attracts articles 202 into the flutes 233d to further ensure that such flutes are filled on their way from the wall 204 toward the upper reach of the conveyor 216.

An important advantage of the improved apparatus is that the flutes of the withdrawing or accepting conveyor are more likely to be filled with articles, even if the withdrawing conveyor is driven at a very high speed. This is attributable to the provision of the feeding unit whose conveyors positively engage the articles which are supplied by the receiving conveyor of the transfer conveyor system so that the articles which are positively held are much less likely to become misaligned during transport toward and through the mouthpiece and into the path of orbital movement of flutes on the withdrawing conveyor. Satisfactory or predictable (reliable) filling of all flutes on the withdrawing conveyor is very important and desirable in many types of machines which produce and/or process rod-shaped smokers' products, especially in filter tipping machines wherein each plain cigarette or each group of plain cigarettes must be combined with one or more filter plugs in order to form therewith a filter cigarette of unit length or multiple unit length.

Another important advantage of the improved apparatus is that, at least in the majority of illustrated embodiments, the pileup zone is configurated and positioned in such a way that the articles which accumulate therein cannot interfere with delivery of articles from the outlet of the magazine or from the channel which connects the outlet with the space directly above the receiving conveyor of the transfer conveyor system. It can be said that such channel (note the channel 327 in FIG. 3) constitutes an extension of the outlet (306) of the respective magazine (301).

A further important advantage of the improved apparatus is that it can accept a multi-layer stream of articles directly form the maker (e.g., via receiver 331 shown in FIG. 3) or directly from the magazine and that the apparatus can reliably convert such multi-layer stream into a single layer successive articles of which are fed into successive flutes of the withdrawing conveyor.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for manipulating rod-shaped articles which constitute or form part of smokers' products and have predetermined diameters, comprising a source of supply of substantially parallel articles, said source having outlet means arranged to discharge articles in such a way that the articles move sideways; a driven withdrawing conveyor having a plurality of article-receiving flutes arranged to move along a predetermined endless path and projections alternating with said flutes and tending to interfere with the admission of articles into said flutes at elevated speeds of said withdrawing conveyor; a transfer conveyor system for delivering articles from said outlet means into successive flutes of said withdrawing conveyor, said system comprising a receiving conveyor arranged to receive articles from said outlet means and to move the articles sideways toward said path, a feeding unit interposed between said receiving conveyor and said path and including a pair of conveyors which define a gap having a width at most equal to said predetermined diameter so that the articles which are delivered by said receiving conveyor form in said gap a single layer successive articles of which are admitted into successive flutes in and substantially radially of said path, and means for driving said receiving conveyor at a speed at least matching the speed of said withdrawing conveyor and for driving at least one of the conveyors in said feeding unit at a speed exceeding the speed of said withdrawing conveyor; and means defining a pileup zone for articles which have left said outlet means and are about to enter said gap, said pileup zone being located downstream of said outlet means as considered in the direction of travel of articles from said source toward said withdrawing conveyor and said receiving conveyor having first and second portions respectively located below said outlet means and said pileup zone.

2. The apparatus of claim 1, wherein said driving means includes means for moving said one conveyor of said feeding unit at a speed which exceeds the speed of said receiving conveyor.

3. The apparatus of claim 1, wherein said one conveyor of said feeding unit is at least substantially aligned with and is supplied with articles by said receiving conveyor.

4. The apparatus of claim 1, further comprising means for driving said withdrawing conveyor at a predetermined speed, said driving means of said system including means for driving said one conveyor of said feeding unit at a speed which exceeds the speed of said receiving conveyor.

5. The apparatus of claim 1, wherein said conveyors of said feeding unit are endless flexible conveyors having parallel stretches which define said gap.

6. The apparatus of claim 1, wherein said outlet means includes a channel having a width sufficient to discharge a multi-layer stream of articles onto said receiving conveyor.

7. The apparatus of claim 6, further comprising partitioning means for at least partially separating said pileup zone from said channel.

8. The apparatus of claim 6, wherein said source of supply comprises an article-containing magazine and a supply duct for delivery of articles into said channel independently of said magazine.

9. The apparatus of claim 8, wherein said outlet means further includes a junction where the articles leaving said magazine mingle with articles leaving said duct, said channel having an upper end and said junction being disposed at the upper end of said channel.

10. The apparatus of claim 8, further comprising means for supplying to said duct a multi-layer stream of parallel articles.

11. The apparatus of claim 10, wherein said magazine comprises a conveyor extending to said junction and operable to advance articles from said magazine into said channel.

12. The apparatus of claim 11, further comprising means for monitoring the rate of delivery of articles from said duct into said junction and means for operating said conveyor of said magazine when the rate of delivery of articles by said duct is reduced below a preselected value.

13. The apparatus of claim 12, wherein said monitoring means includes mechanical sensor means resting on the articles in said junction.

14. The apparatus of claim 1, wherein said receiving conveyor is a suction conveyor arranged to attract the articles during transport from said outlet means toward said gap.

15. The apparatus of claim 1, wherein said receiving conveyor has article-receiving flutes wherein the articles are transported from said outlet means toward said gap.

16. The apparatus of claim 1, wherein said receiving conveyor comprises a rotary conveyor having peripheral flutes for transport of articles in a direction from said outlet means toward said gap.

17. The apparatus of claim 1, further comprising means for monitoring the number of articles in said gap, said driving means including means for varying the speed of said receiving conveyor in dependency on the monitored number of articles in said gap.

18. The apparatus of claim 17, wherein said means for varying the speed of said receiving conveyor includes means for increasing the speed of said receiving conveyor when the number of monitored articles in said gap decreases below a predetermined number and vice versa.

19. The apparatus of claim 18, further comprising means for driving said withdrawing conveyor at a predetermined speed which equals the speed of said receiving conveyor when the number of articles in said gap exceeds said predetermined number.

20. The apparatus of claim 17, wherein said monitoring means includes a light source at one side of said gap and a photosensitive transducer disposed opposite said source at the other side of said gap.

21. The apparatus of claim 1, wherein said withdrawing conveyor is a rotary drum-shaped conveyor and said flutes are disposed at the periphery of said rotary conveyor.

22. The apparatus of claim 1, further comprising a mouthpiece interposed between said gap and said path, successive articles of the single layer of articles in said gap passing through said mouthpiece on their way into the oncoming flutes of said withdrawing conveyor.

* * * * *